(No Model.)

W. E. CLARK.
SWING.

No. 560,609. Patented May 19, 1896.

Witnesses:
Edw. P. Duvall Jr.
C. F. Duvall

Inventor:
Walter E. Clark.
by W. J. Duvall, Atty.

UNITED STATES PATENT OFFICE.

WALTER E. CLARK, OF PICTURE ROCKS, PENNSYLVANIA, ASSIGNOR OF ONE-HALF TO LLOYD M. WHITE, OF BLOOMSBURG, PENNSYLVANIA.

SWING.

SPECIFICATION forming part of Letters Patent No. 560,609, dated May 19, 1896.

Application filed October 4, 1895. Serial No. 564,588. (No model.)

*To all whom it may concern:*

Be it known that I, WALTER E. CLARK, a citizen of the United States, residing at Picture Rocks, in the county of Lycoming and State of Pennsylvania, have invented certain new and useful Improvements in Swings; and I do hereby declare the following to be a full, clear, and exact description of the invention, such as will enable others skilled in the art to which it appertains to make and use the same.

My invention relates to improvements in swings of that class that are designed for use on lawns or porches; and the objects in view are to produce a swing of this class comprising few parts, simply constructed and assembled; which is capable of being compactly folded for storage and transportation, and, finally, to adapt the seats to be adjustable when in use.

Various other objects of the invention will appear in the following description, and the novel features thereof will be particularly pointed out in the appended claims.

Figure 1:
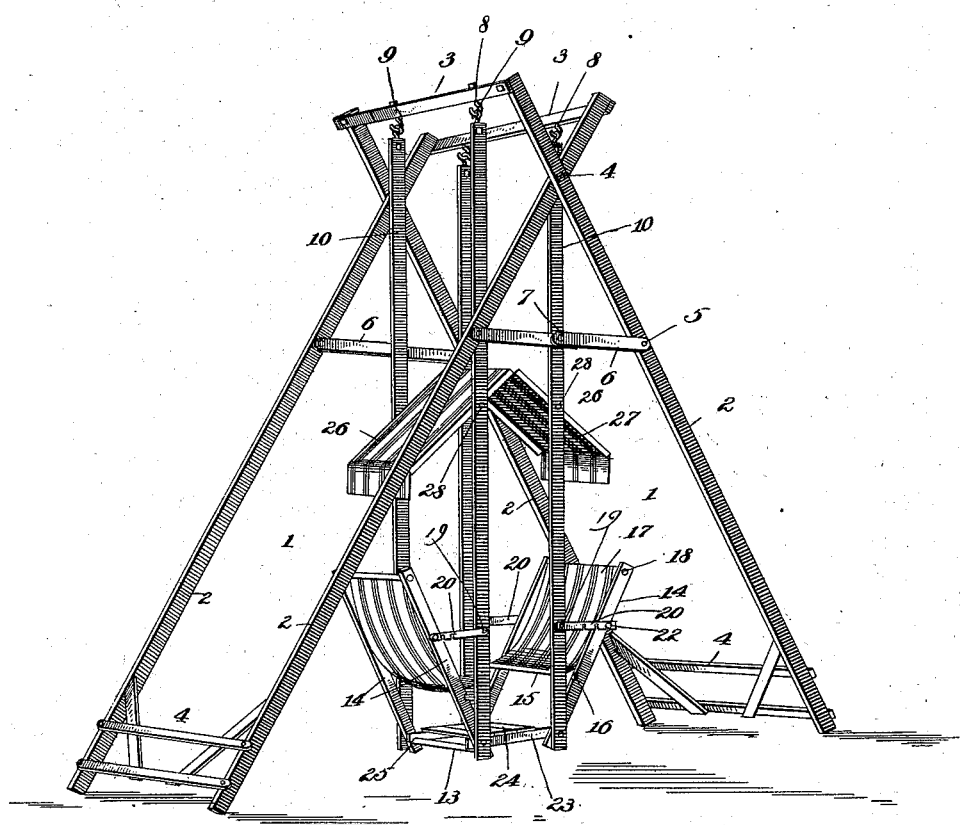
Figures 2, 3:
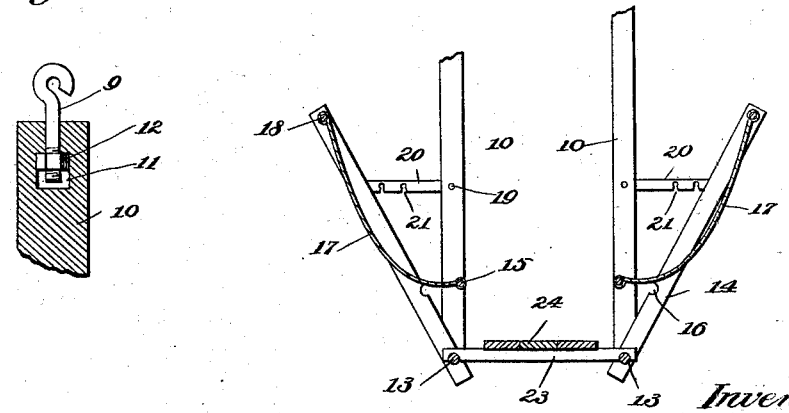

Referring to the drawings, Figure 1 is a perspective view of a swing embodying my invention. Fig. 2 is a detail in section of the upper end of one of the suspension-bars. Fig. 3 is a vertical transverse sectional view through the lower portion of the swing or seats.

Like numerals of reference indicate like parts in all the figures of the drawings.

In practicing my invention I employ a pair of opposing oblong supporting-frames 1, and each consists of opposite parallel longitudinally-disposed side bars 2, upper connecting-bars 3, bolted to the outer edges of the side bars 2, and lower connecting or brace bars 4.

Each pair of supporting-frames 1 is constructed in suitable proportions as to height, and these proportions may of course be varied in accordance with the size of swing desired, so that the swing may be constructed for indoor use as well as for lawn and porch purposes.

One of the supporting-frames is made slightly narrower than its companion, and has its upper end inserted through and embraced by its companion, and the adjacent side bars 2 of the two frames are, at their points of intersection, which is a short distance below their upper ends, pivotally bolted together, as indicated at 4. Below their pivot-point each side bar 2 of each supporting-frame 1 has pivoted to its outer face, as indicated at 5, the outer end of a brace-section 6, the ends of these two sections overlapping and being secured removably together by a bolt 7.

Eyebolts 8 depend in pairs from each of the cross-bars 3 of the supporting-frame 1, and engaging therewith in a removable manner are hook-bolts 9, which are inserted in the upper ends of opposing pairs of swing or suspension bars 10. These suspension-bars 10 are provided near their upper ends with openings 11, into which the lower ends of the hook-bolts 9 extend, and by means of which it is made possible to thread the nuts 12 on the lower ends of the hook-bolts, whereby the latter are secured in position.

The lower ends of each pair of swing-bars 10 are connected by preferably round rungs 13, and pivoted upon their lower ends upon said rungs are opposite pairs of seat-bars 14. These seat-bars 14 are located between each pair of swing-bars, and hence are capable of being swung between the same or outwardly, in opposite directions, therefrom. Seat-rungs 15 connect each pair of swing-bars 10 a suitable distance above the lower ends of the latter, and in order to permit of the inward folding of the seat-bars regardless of the presence of the rungs 15 the said seat-bars are notched at their front edges, as at 16, in order to receive the rungs 15 when the seat-bars are folded.

A flexible seat 17 is secured to the seat-rung 15 and at its opposite end made fast to the back rung 18, one of which is employed to connect the upper ends of each pair of seat-bars 14. This seat, it will be understood, is preferably made of fabric—such as, for instance, canvas.

Pivoted to the outer face of each of the swing-bars 10, as indicated at 19, is an arm bar or plate 20, the same being formed of metal or wood, as desired, and each has its lower edge provided with a plurality of key-hole openings or slots 21, any one of which may be engaged removably over a headed stud 22 with which the outer face of each seat-bar is provided.

Upon the bottom rungs 13 there is supported in a removable manner a platform, and the same consists of a pair of opposite side bars 23, which are located between the opposite pairs of seat-bars 14 and rest-boards 24. The ends of the bars 23 project beyond the rest-boards, and upon their under sides such extensions are provided with half-round notches 25, that take removably over rungs 13.

26 designates a pair of opposing awnings or canopies, the same being independent of each other, and one being designed for each seat as constructed. Each canopy comprises a rectangular frame, to which is secured a suitable covering 27. The side bars of each canopy-frame are pivoted, as at 28, between the pairs of swing-bars 10, and such canopies are therefore adapted to be adjusted at any inclination desired to suit the occupant of each seat or to be folded longitudinal with the swing-bars when it is desired to fold the swing when out of use.

The operation of swinging or operating the swing by pressure of the feet of the operators alternately employed is too well known to require minute description. It will be sufficient to say that the swing is operated in the usual manner by either one or two occupants, the seats and canopies being adjusted to suit their respective occupant.

It will be seen that the swing comprises few parts that are easily assembled and which are cheaply manufactured, and while foldable so as to be compactly stored yet when set up is very rigid and secure.

In order to fold the swing, the arm-plates 20 are disconnected from the headed studs 22, whereupon both the plates 20 and seat-bars 14 may be swung to positions alining with the swing-bars 10, the notches 16 of the seat-bars receiving the seat-rungs 15 and the flexible seats 17 readily accommodating themselves to such positions of these parts. The canopies are folded so as to aline with the swing-bars 10 and the platform removed from the rungs 13. The bolts 7 are removed from the braces 6 and the latter swung to aline with the side bars 2 of the supporting-frames 1. These supporting-frames may now be brought together at their lower ends, so that but a small space is occupied by the entire structure. If, however, the swing is to be packed for shipment where great economy of space is required, it is preferable to wholly disconnect by unhooking the upper ends of the swing-bars from the eyebolts 8. The swing-bars may then be folded upon each other and the supporting-frames folded in the manner before described.

Having described my invention, what I claim is—

1. In a swing, the combination with the oblong supporting-frames, one of which receives the other, the two being pivoted together near their upper ends and at their points of intersection, the brace-sections pivoted at their outer ends to the side bars of the supporting-frames, and means for removably connecting the overlapping ends of said sections, of opposite pairs of swing-bars loosely and removably connected to the upper ends of the supporting-frames, rungs connecting the lower ends of each pair of swing-bars, rungs connecting said swing-bars above their lower ends, opposite pairs of seats-bars pivotally mounted on the lower rungs and adapted to fold between the swing-bars, and having their front edges notched to receive said upper rungs, rungs connecting the upper ends of the seat-bars, flexible seats connected to the same and to the upper rungs of the swing-bars, detachable connecting devices between the swing-bars and seat-bars, and a detachable platform supported by the lower rungs, substantially as specified.

2. In a swing, the combination with the oblong supporting-frames, one of which receives the other, the two being pivotally connected together near their upper ends and at their points of intersection, the brace-sections pivoted at their outer ends to the side bars of the supporting-frames, and means for removably connecting the overlapping ends of said sections, of opposite pairs of swing-bars loosely and removably connected to the upper ends of the supporting-frames, rungs connecting the lower ends of each pair of swing-bars, rungs connecting said swing-bars above their lower ends, opposite pairs of seat-bars pivotally mounted on the lower rungs and adapted to fold between the swing-bars, and having their front edges notched to receive said upper rungs, rungs connecting the upper ends of the seat-bars, flexible seats connected to the same and to the upper rungs of the swing-bars, detachable connecting devices between the swing-bars and seat-bars, arm-plates pivoted to the swing-bars and provided each on its under side with a plurality of notches, headed studs extending from the seat-bars and adapted to engage any one of said notches, canopies independently pivoted between the swing-bars and the removable platform having its side bars extended and provided with half-round notches for engaging the rungs at the lower ends of the swing-bars, substantially as specified.

In testimony whereof I affix my signature in presence of two witnesses.

WALTER E. CLARK.

Witnesses:
L. M. WHITE,
J. C. RUTTER, Jr.